Patented June 22, 1948

2,443,827

UNITED STATES PATENT OFFICE 2,443,827

PREPARATION OF ACETYL-
BUTYROLACTONE

William L. Johnson, Baltimore, Md., assignor to
U. S. Industrial Chemicals, Inc., New York,
N. Y., a corporation of Delaware No Drawing. Application February 17, 1945,
Serial No. 578,557

8 Claims. (Cl. 260—344)

This invention relates to a novel procedure for the preparation of acetylbutyrolactone, a compound which is useful as an intermediate in the production of other organics adapted for medicinal and other purposes.

Acetylbutyrolactone or alpha acetyl gamma butyrolactone is a compound which boils at 107–108° C. at 5 mm. pressure and has a specific gravity at 20/20 of 1.185–1.189. The compound is known. Preparation thereof on other than a laboratory scale has been difficult because the known procedure involves the use of metallic sodium and the method of recovery of the product is complicated, time-consuming and expensive. Furthermore, the known product is often impure, as evidenced by its yellow color and lowered specific gravity.

It is the object of the invention to provide a simple and effective procedure, well adapted for use in the commercial production of the compound.

Another object of the invention is a method of producing acetylbutyrolactone of high purity.

Other objects and advantages of the invention will be apparent as it is better understood by reference to the following specification, in which the novel procedure is described.

In accordance with the invention, acetylbutyrolactone is prepared by reacting ethylene oxide and ethyl acetoacetate under alkaline conditions with subsequent neutralization, extraction and fractionation. The reaction may be summarized as follows:

$C_2H_4O + CH_3COCH_2COOC_2H_5 \longrightarrow$

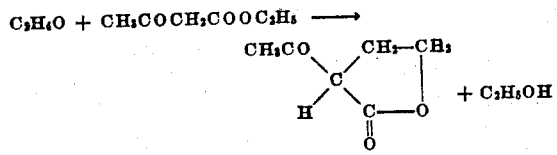

$+ C_2H_5OH$

The following example will illustrate the procedure. In a three-necked, five-liter flask fitted with a thermometer and mechanical stirrer and immersed in an ice and salt bath, dissolve 200 grams (5 mols) of sodium hydroxide in 1350 cc. of water. After the solution is cooled to 20° C., add 450 cc. of ethyl alcohol. Continue cooling to about —5° C. Then slowly add a mixture of 220 grams of ethylene oxide (5 mols) and 650 grams of ethyl acetoacetate (5 mols) previously cooled to 0° C. During this addition, the mixture should be stirred and the temperature should not rise above 0° C. After all of the reactants have been added, the flask is maintained at 0° C. to —5° C. for forty-eight hours.

The temperature is critical. Hence it is necessary to take adequate precautions to avoid any rise of temperature above 0° C. At this temperature and below, saponification of the ethyl acetoacetate is substantially reduced. At higher temperatures, saponification results in the formation of the sodium salt of acetoacetic acid which is not effective in furthering the desired reaction and causes contamination of the product. If, however, the necessary precautions are observed, a minimum quantity of the sodium salt of acetoacetic acid is formed.

At the end of forty-eight hours, the mixture is neutralized with 300 grams (5 mols) of glacial acetic acid and the neutralized mixture is extracted with benzol. It is suitable to employ three extractions using one 500 cc. and two 250 cc. portions of benzol. The extracts are combined and then fractionated first at atmospheric or reduced pressure to remove benzol, alcohol and water, and then under reduced pressure to recover unreacted ethyl acetoacetate and acetylbutyrolactone. A yield of 60% of the desired lactone is obtained.

The product has the characteristics hereinbefore mentioned and is, moreover, water-white and substantially free from impurities. It is well adapted for use as an intermediate in the production of other organics.

The procedure has a definite advantage in that it does not require the handling of metallic sodium and consequently the precautions which are always necessary where metallic sodium is used. The absence of metallic sodium facilitates the application of the procedure in relatively large scale commercial operations. Furthermore, the separation of the various constituents of the mixture and particularly the desired product may be accomplished readily in the manner described. The ethyl acetoacetate which is not reacted may be returned for further use in the process, together with the benzol and alcohol which are also recovered.

Various changes may be made in the details of procedure as described without departing from the invention or sacrificing the advantages thereof.

I claim:

1. The method of preparing alpha acetyl gamma butyrolactone which comprises reacting ethylene oxide with ethyl acetoacetate in an aqueous solution of an alkali metal hydroxide, maintaining the temperature during the reaction at a point not higher than 0° C. and recovering the alpha acetyl gamma butyrolactone from the solution.

2. The method of preparing alpha acetyl gamma butyrolactone which comprises reacting ethylene oxide with ethyl acetoacetate in an aqueous solution of an alkali metal hydroxide, maintaining the temperature during the reaction between 0° and —5° C., and recovering the alpha acetyl gamma butyrolactone from the solution.

3. The method of preparing alpha acetyl gamma butyrolactone which comprises reacting ethylene oxide with ethyl acetoacetate in an aqueous solution of an alkali metal hydroxide, maintaining the temperature during the reaction at a point not higher than 0° C. and recovering the alpha acetyl gamma butyrolactone from the solution by extracting with benzol and fractionating the extract.

4. The method of preparing alpha acetyl gamma butyrolactone which comprises reacting ethylene oxide with ethyl acetoacetate in an aqueous solution of an alkali metal hydroxide, maintaining the temperature during the reaction between 0° and —5° C., and recovering the alpha acetyl gamma butyrolactone from the solution by extracting with benzol and fractionating the extract.

5. The method of preparing alpha acetyl gamma butyrolactone which comprises reacting ethylene oxide with ethyl acetoacetate in an aqueous solution of sodium hydroxide, maintaining the temperature during the reaction at a point not higher than 0° C. and recovering the alpha acetyl gamma butyrolactone from the solution.

6. The method of preparing alpha acetyl gamma butyrolactone which comprises reacting ethylene oxide with ethyl acetoacetate in an aqueous solution of sodium hydroxide, maintaining the temperature during the reaction between 0° and —5° C., and recovering the alpha acetyl gamma butyrolactone from the solution.

7. The method of preparing alpha acetyl gamma butyrolactone which comprises reacting ethylene oxide with ethyl acetoacetate in an aqueous solution of sodium hydroxide, maintaining the temperature during the reaction at a point not higher than 0° C. and recovering the alpha acetyl gamma butyrolactone from the solution by extracting with benzol and fractionating the extract.

8. The method of preparing alpha acetyl gamma butyrolactone which comprises reacting ethylene oxide with ethyl acetoacetate in an aqueous solution of sodium hydroxide, maintaining the temperature during the reaction between 0° and —5° C., and recovering the alpha acetyl gamma butyrolactone from the solution by extracting with benzol and fractionating the extract.

WILLIAM L. JOHNSON.

REFERENCES CITED

The following references are of record in the file of this patent:

UNITED STATES PATENTS

| Number | Name | Date |
| --- | --- | --- |
| 2,193,858 | Buchman | Mar. 19, 1940 |
| 2,218,349 | Buchman | Oct. 15, 1940 |
| 2,391,530 | Wallingford et al. | Dec. 25, 1945 |

OTHER REFERENCES

Chemical abstracts, 1934, volume 28, page 4382, Knunyantz et al.